US012399036B2

(12) United States Patent
Shirakawa et al.

(10) Patent No.: US 12,399,036 B2
(45) Date of Patent: Aug. 26, 2025

(54) POSITION DETECTION DEVICE

(71) Applicant: Proterial, Ltd., Tokyo (JP)

(72) Inventors: Yohei Shirakawa, Tokyo (JP); Yukio Ikeda, Tokyo (JP)

(73) Assignee: Proterial, Ltd., Tokyo (JP)

(*) Notice: Subject to any disclaimer, the term of this patent is extended or adjusted under 35 U.S.C. 154(b) by 195 days.

(21) Appl. No.: 18/455,132

(22) Filed: Aug. 24, 2023

(65) Prior Publication Data

US 2024/0077334 A1 Mar. 7, 2024

(30) Foreign Application Priority Data

Aug. 30, 2022 (JP) .................................. 2022-136567
Jul. 24, 2023 (JP) .................................. 2023-120025

(51) Int. Cl.
*G01D 5/20* (2006.01)
*B62D 15/02* (2006.01)

(52) U.S. Cl.
CPC ........... *G01D 5/20* (2013.01); *B62D 15/0225* (2013.01); *G01D 5/2053* (2013.01)

(58) Field of Classification Search
CPC ........ G01D 5/20; G01D 5/204; G01D 5/2046; G01D 5/2053; G01D 5/225; G01D 5/2258; G01D 5/2275; B62D 15/0225
See application file for complete search history.

(56) References Cited

U.S. PATENT DOCUMENTS

| 7,868,609 B2* | 1/2011 | Zhitomirskiy | G01D 5/204 |
| | | | 324/207.17 |
| 2009/0102463 A1* | 4/2009 | May | G01D 5/2046 |
| | | | 324/207.16 |
| 2011/0109303 A1* | 5/2011 | Zhitomirsky | G01D 5/204 |
| | | | 324/683 |
| 2017/0350728 A1* | 12/2017 | Tiemann | G01D 5/2053 |
| 2020/0116529 A1* | 4/2020 | Oshinubi | G01D 5/2053 |
| 2020/0271480 A1* | 8/2020 | Shaga | G01D 5/2073 |
| 2020/0278190 A1* | 9/2020 | Bertini | G01D 5/2258 |
| 2021/0048315 A1* | 2/2021 | Meyer | G01D 5/2046 |
| 2021/0341312 A1* | 11/2021 | Lange | G01B 7/003 |
| 2023/0129608 A1* | 4/2023 | Tiemann | G01D 5/2497 |
| | | | 324/207.15 |

FOREIGN PATENT DOCUMENTS

JP 2009-002770 A 1/2009

* cited by examiner

*Primary Examiner* — Steven L Yeninas
(74) *Attorney, Agent, or Firm* — Studebaker Brackett PLLC

(57) ABSTRACT

A position detection device configured to detect a position of a moving member that moves back and forth in a predetermined moving direction is provided with an exciting coil arranged to extend in the moving direction along the moving member, and a detection coil that, by an action of a magnetic field generated by the exciting coil, can detect a position, in the moving direction, of a detection object portion provided on the moving member within a predetermined detection range. A plurality of the detection coils are arranged side by side in a direction perpendicular to an extending direction of the exciting coil. A plurality of the detection object portions are provided at different positions in the moving direction so as to respectively correspond to the plurality of the detection coils, and the respective detection ranges of the plurality of the detection coils are offset in the moving direction of the moving member.

11 Claims, 11 Drawing Sheets

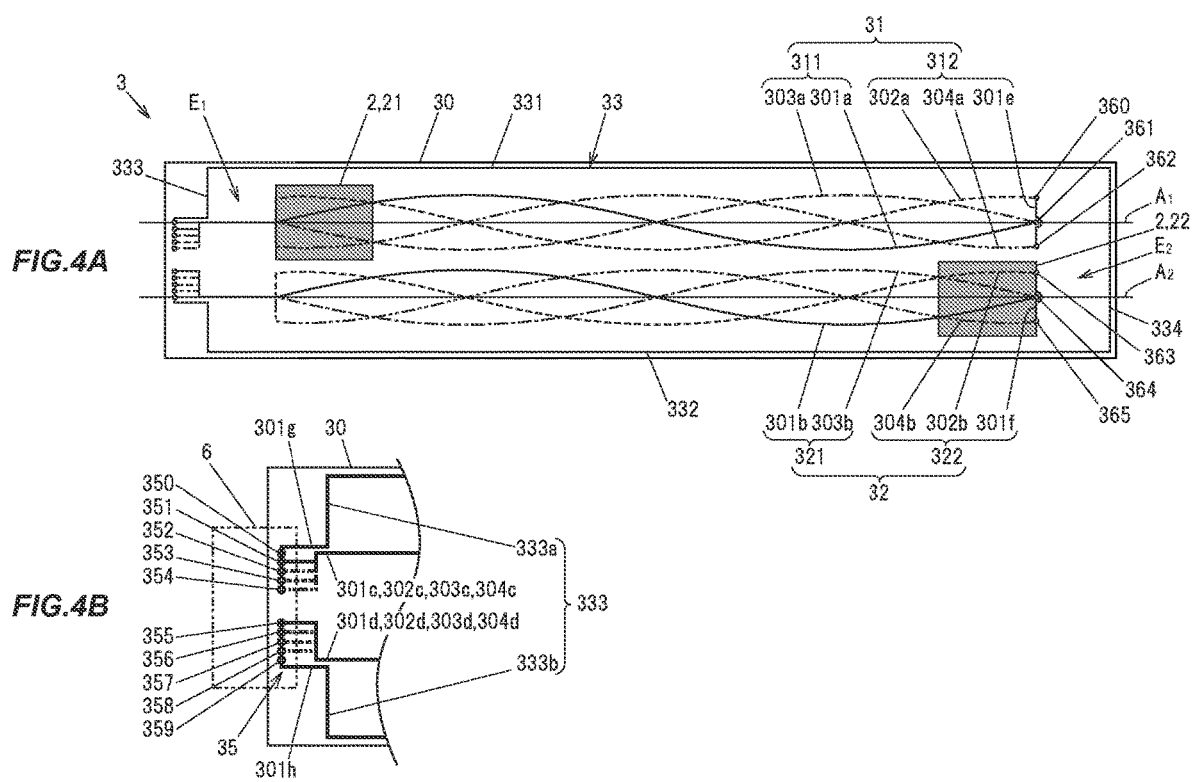

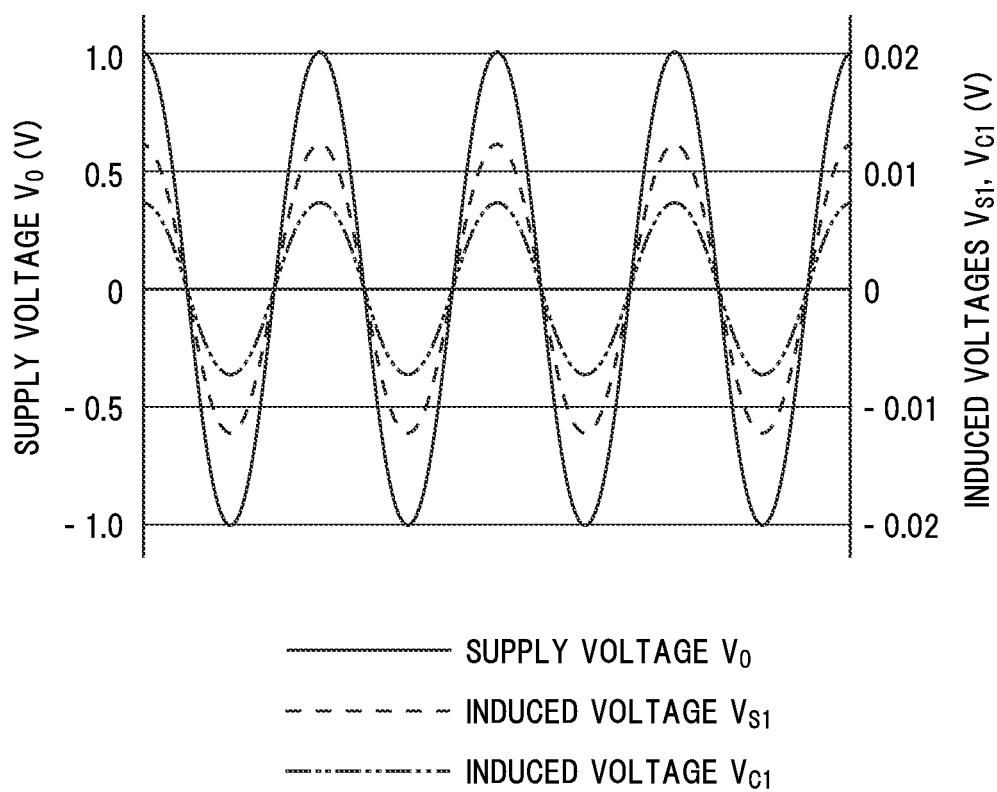

FIG.7A
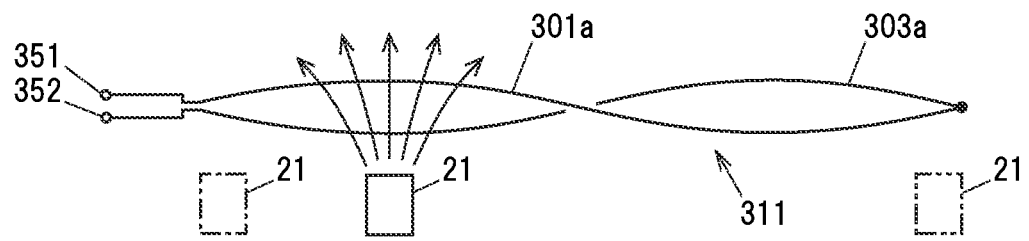
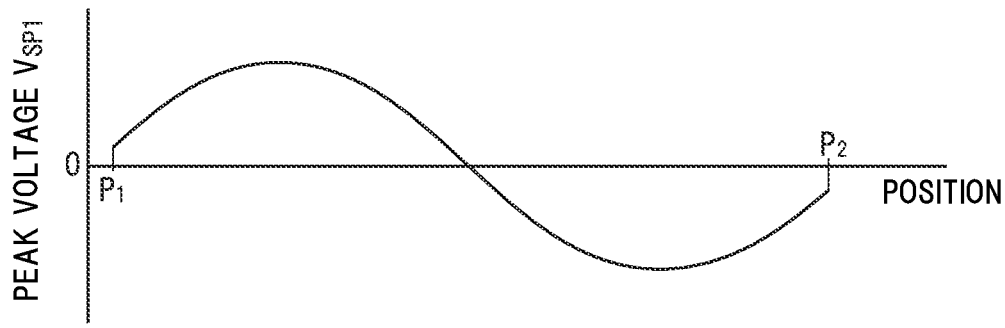
FIG.7B
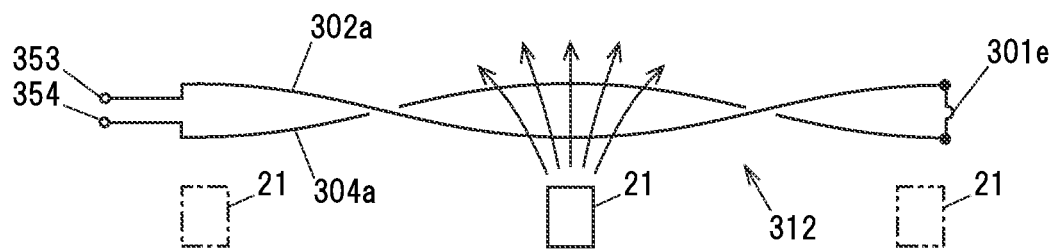
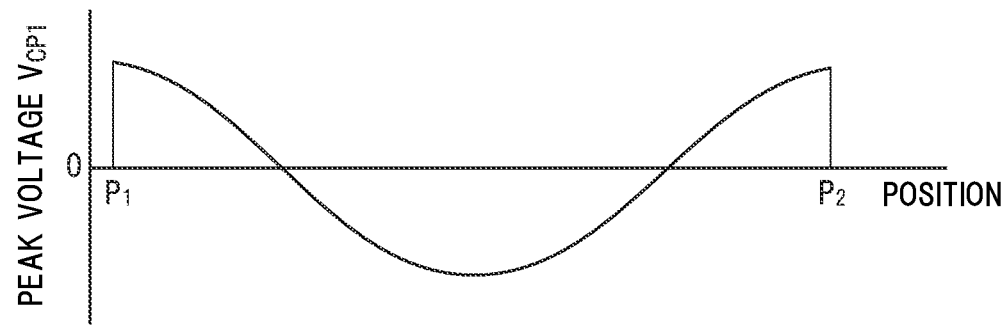

POSITION DETECTION DEVICE

CROSS-REFERENCE TO RELATED APPLICATIONS

The present application is based on Japanese patent application No. 2022-136567 filed on Aug. 30, 2022, and Japanese patent application No. 2023-120025 filed on Jul. 24, 2023, the entire contents of which are incorporated herein by reference.

TECHNICAL FIELD

The present invention relates to a position detection device to detect a position of a moving member that moves back and forth (i.e., reciprocating motion) in a predetermined moving direction.

BACKGROUND OF THE INVENTION

Conventionally, position detection devices to detect a position of a moving member which moves back and forth in a predetermined moving direction are used in various fields such as industrial machinery and automobiles.

The electromagnetic induction linear scale (i.e., linear encoder) described in Patent Literature 1 has a coil array composed of a predetermined number of coil elements to be excited by a first AC signal, a magnetic member that relatively displaces along an axis of the coil array on the outer side of the coil array, and a detection unit that detects a position of the magnetic member relative to the coil array based on output voltages of respective coil elements. The magnetic member causes changes in the amplitude of the output voltages of the coil elements according to the positional relationship with the coil elements. The detection unit detects the position of the magnetic member relative to the coil array in absolute terms based on a phase difference between the first AC signal and a second AC signal which is obtained by synthesizing differential outputs between the coil elements.

Citation List

Patent Literature 1: JP2009-2770A

SUMMARY OF THE INVENTION

In the electromagnetic induction linear scale described in Patent Literature 1, the coil array must be arranged over the entire movement range of the magnetic member, and the longer the movement range of the magnetic member, the larger the size of the coil array. Therefore, it is an object of the invention to provide a position detection device that can be reduced in size.

To achieve the object described above, one aspect of the invention provides a position detection device configured to detect a position of a moving member that moves back and forth in a predetermined moving direction, the position detection device comprising:
- an exciting coil arranged to extend in the moving direction along the moving member; and
- a detection coil that, by an action of a magnetic field generated by the exciting coil, can detect a position, in the moving direction, of a detection object portion provided on the moving member within a predetermined detection range, wherein a plurality of the detection coils are arranged side by side in a direction perpendicular to an extending direction of the exciting coil, wherein a plurality of the detection object portions are provided at different positions in the moving direction so as to respectively correspond to the plurality of the detection coils, and wherein the respective detection ranges of the plurality of the detection coils are offset in the moving direction of the moving member.

Advantageous Effects of the Invention

According to the invention, it is possible to reduce the size of a position detection device.

BRIEF DESCRIPTION OF DRAWINGS

FIG. 4A is an overall view in which wiring patterns formed on first to fourth metal layers of the substrate are shown in a see-through manner.

FIG. 4B is a partial enlarged view of FIG. 4A.

FIG. 6 is a graph showing an example of a relationship between supply voltage supplied from a power supply unit to an exciting coil, induced voltage induced in a first sine wave-shaped coil element of a first detection coil, and induced voltage induced in a first cosine wave-shaped coil element of the first detection coil.

FIG. 7A is an explanatory diagram illustrating a relationship between a position of a first target and peak voltage which is a peak value of the induced voltage induced in the first sine wave-shaped coil element.

FIG. 7B is an explanatory diagram illustrating a relationship between the position of the first target and peak voltage which is a peak value of the induced voltage induced in the first cosine wave-shaped coil element.

DETAILED DESCRIPTION OF THE INVENTION

Embodiment

Figure 1:
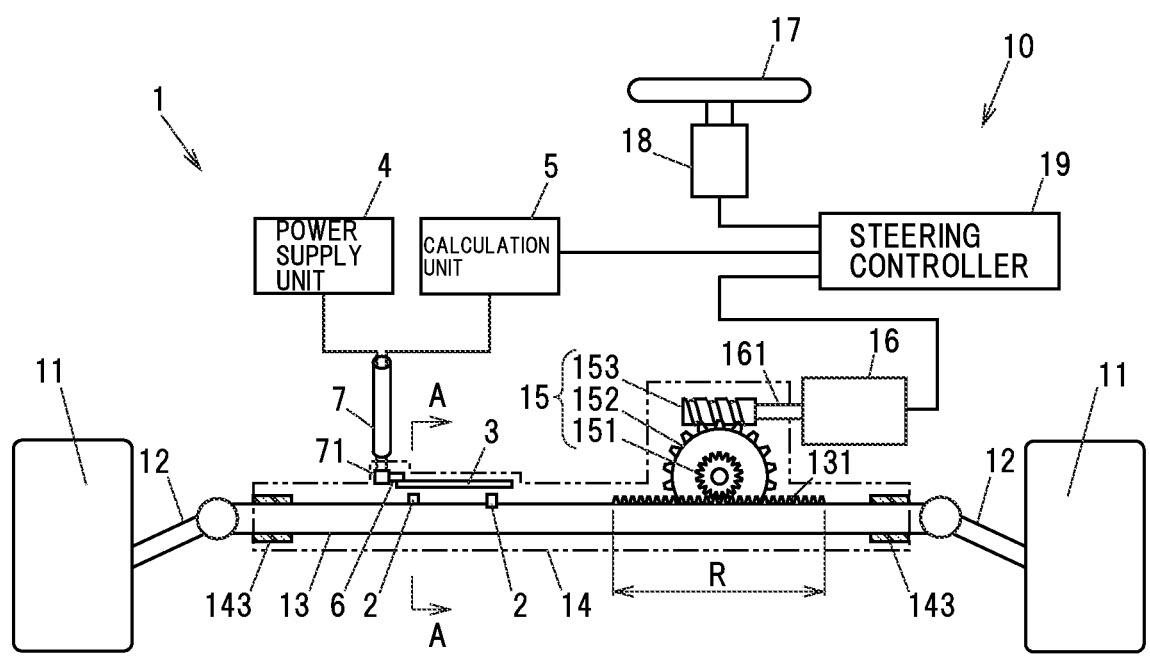
FIG. 1 is a schematic diagram illustrating a vehicle on which a steer-by-wire steering system including a stroke sensor as a position detection device in an embodiment of the present invention is mounted.

FIG. 1 is a schematic diagram illustrating a vehicle on which a steer-by-wire steering system 10 including a stroke sensor 1 as a position detection device in an embodiment of the invention is mounted. In FIG. 1, the steering system 10 is viewed from the rear side in a vehicle front-rear direction, the right side of the drawing corresponds to the right side in a vehicle width direction, and the left side of the drawing corresponds to the left side in the vehicle width direction. The terms "right" and "left" are sometimes used in the following description with reference to the drawings, but this expression is used for convenience of explanation and does not limit the direction of arrangement when the stroke sensor 1 is actually in use.

As shown in FIG. 1, the steering system 10 includes the stroke sensor 1, tie rods 12 connected to steered wheels 11 (left and right front wheels), a rack shaft 13 connected to the tie rods 12, a cylindrical housing 14 that houses the rack shaft 13, a worm speed reduction mechanism 15 having a pinion gear 151 meshed with rack teeth 131 of the rack shaft 13, an electric motor 16 that applies a moving force in a vehicle width direction to the rack shaft 13 through the worm speed reduction mechanism 15, a steering wheel 17 operated by a driver, a steering angle sensor 18 to detect a steering angle of the steering wheel 17, and a steering controller 19 that controls the electric motor 16 based on the steering angle detected by the steering angle sensor 18.

The rack shaft 13 is a moving member whose position relative to the housing 14 is detected by the stroke sensor 1. A moving direction of the rack shaft 13 is an axial direction parallel to a central axis of the rack shaft 13.

In FIG. 1, the housing 14 is indicated by a phantom line. The rack shaft 13 is made of, e.g., steel such as carbon steel and is supported by a pair of rack bushings 143 attached to both ends of the housing 14. The worm speed reduction mechanism 15 has a worm wheel 152 and a worm gear 153, and the pinion gear 151 is fixed to the worm wheel 152. The worm gear 153 is fixed to a motor shaft 161 of the electric motor 16.

The electric motor 16 generates torque by a motor current supplied from the steering controller 19 and rotates the worm wheel 152 and the pinion gear 151 through the worm gear 153. When the pinion gear 151 rotates, the rack shaft 13 linearly moves back and forth along the vehicle width direction, and the left and right steered wheels 11 are steered. The rack shaft 13 can move to the right and left in the vehicle width direction within a predetermined range from a neutral position at which the steering angle is zero.

In FIG. 1, a double-headed arrow indicates a stroke range R that corresponds to the maximum travel distance of the rack shaft 13 when the steering wheel 17 is operated from one of the left and right maximum steering angles to the other maximum steering angle. The stroke sensor 1 can detect the absolute position of the rack shaft 13 relative to the housing 14 over the entire stroke range R.

Configuration of Stroke Sensor 1

The stroke sensor 1 includes a target 2 which is made of a conductive metal and is attached to the rack shaft 13, a substrate 3 arranged so as to face the target 2, a power supply unit 4, and a calculation unit 5. The substrate 3 is fixed to the housing 14 so as to be parallel to the rack shaft 13. The stroke sensor 1 detects the position of the rack shaft 13 in the axial direction (the moving direction) relative to the housing 14 based on the position of the target 2 and outputs information of the detected position to the steering controller 19. The steering controller 19 controls the electric motor 16 so that the position of the rack shaft 13 detected by the stroke sensor 1 corresponds to the steering angle of the steering wheel 17 detected by the steering angle sensor 18.

Figure 2:
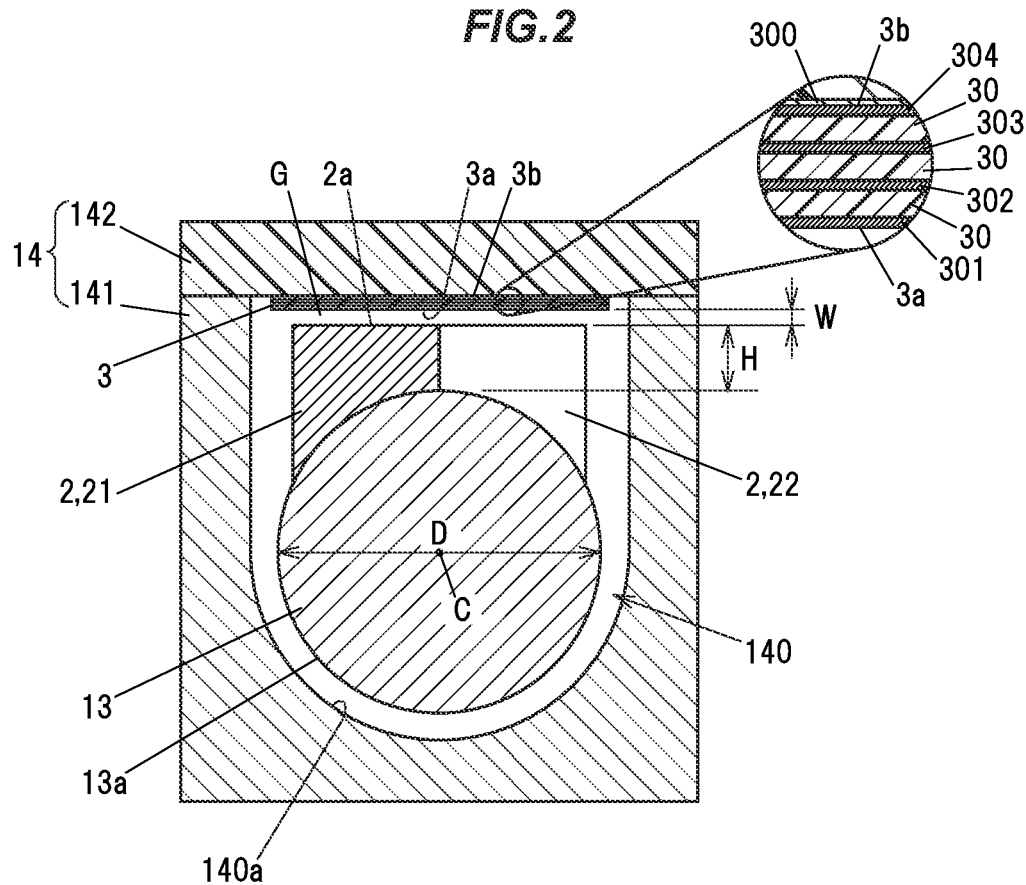
FIG. 2 is a cross-sectional view taken along a line A-A in FIG. 1.
Figure 3:
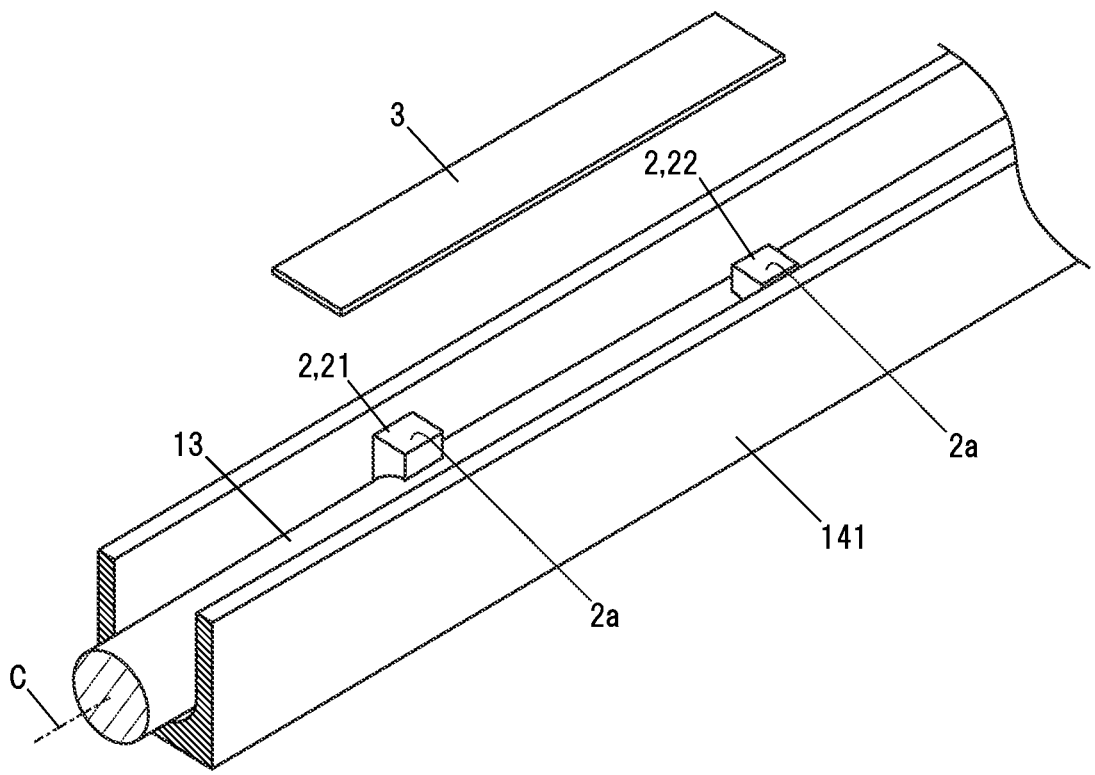
FIG. 3 is a perspective view showing a rack shaft, a housing, targets and a substrate.
Figure 5A:
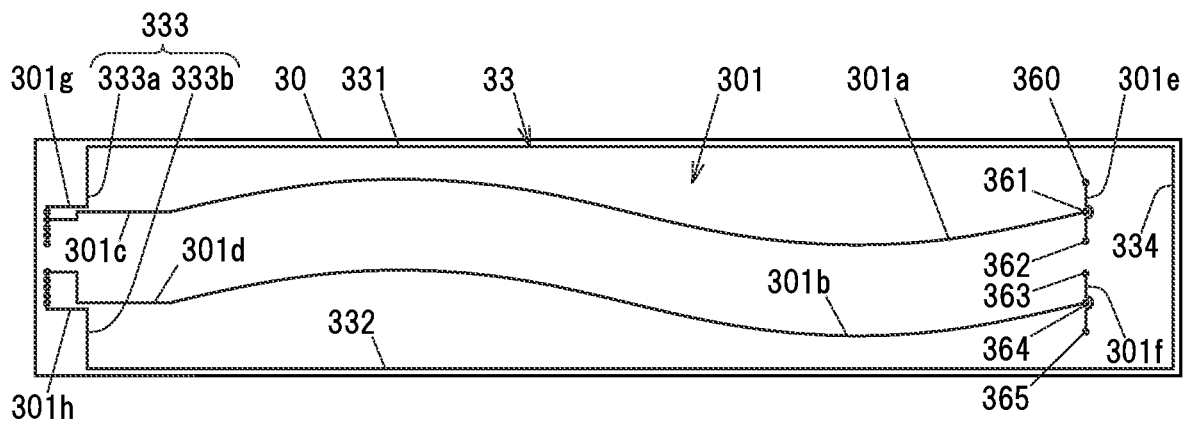
FIGS. 5A to 5D are plan views respectively showing the first to fourth metal layers.
Figure 5B:
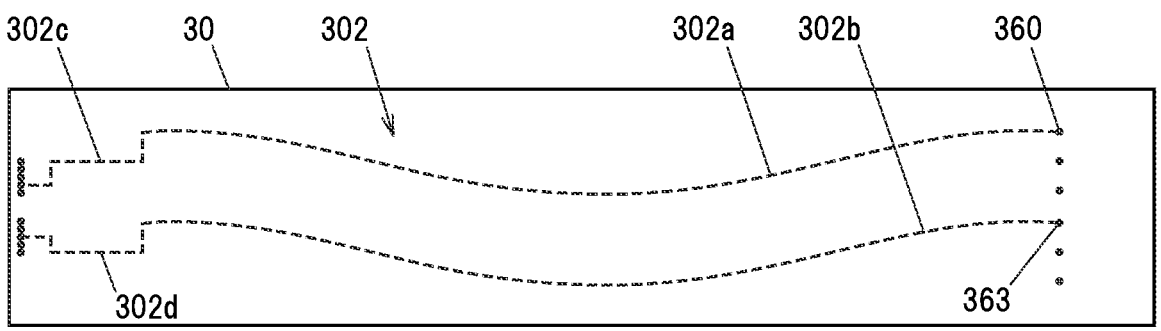
Figure 5C:
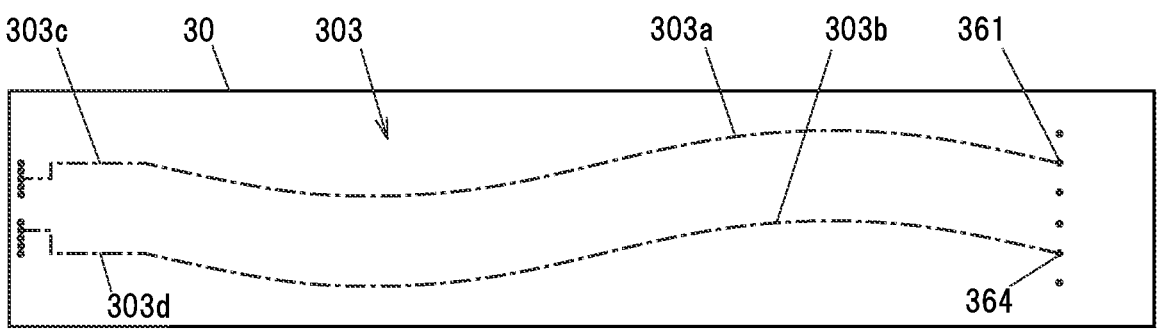
Figure 5D:
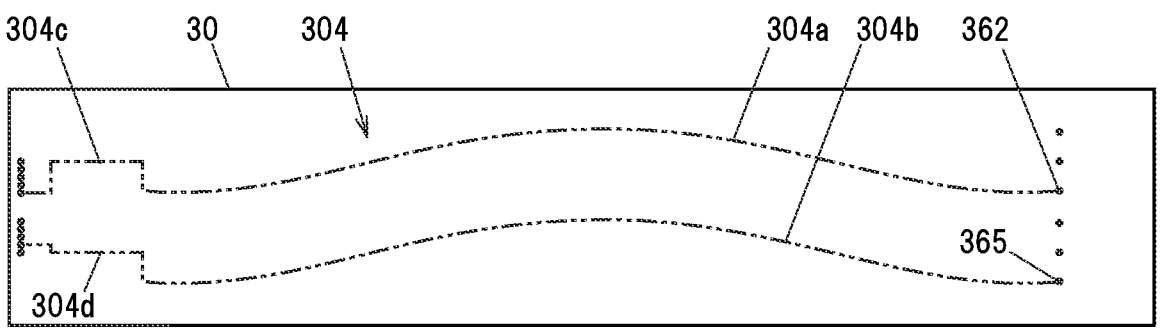

FIG. 2 is a cross-sectional view taken along a line A-A in FIG. 1. FIG. 3 is a perspective view showing the rack shaft 13, a main body 141 of the housing 14, the targets 2 and the substrate 3.

The rack shaft 13 is a rod-shaped body made of steel and having a circular cross-sectional shape. The housing 14 has the main body 141 made of metal and a lid 142 made of resin, and the lid 142 is fixed to the main body 141 by, e.g., adhesion. The main body 141, on which a housing space 140 to house the rack shaft 13 is formed, has a U-shape in cross section, and the housing space 140 is open upward in the vertical direction. A diameter D of the rack shaft 13 is, e.g., 25 mm.

A gap of, e.g., not less than 1 mm is formed between an outer peripheral surface 13a of the rack shaft 13 and an inner surface 140a of the housing space 140. The lid 142 is formed in a flat plate shape and covers the housing space 140 from above in the vertical direction. The main body 141 is made of, e.g., a die-cast aluminum alloy. The material of the lid 142 is not necessarily limited to resin but is desirably a non-conductive material.

The target 2 is a detection object portion for detection of the position of the rack shaft 13. The target 2 may be formed on the rack shaft 13 by machining the shaft material, or the target 2 may be formed as a metal member separate from the rack shaft 13 and fixed to the rack shaft 13 by welding, etc. The target 2 is made of a material with a higher magnetic permeability than that of the rack shaft 13 or a material with a higher conductivity than that of the rack shaft 13. When a material with a higher magnetic permeability than that of the rack shaft 13 is used for the target 2, e.g., a magnetic material such as ferrite can be used as the material. Meanwhile, when a material with a higher conductivity than that of the rack shaft 13 is used for the target 2, e.g., an aluminum alloy or copper alloy can be suitably used as the material. In the present embodiment, since the target 2 is provided so as to protrude from the outer peripheral surface 13a of the rack shaft 13 toward the substrate 3, it is possible to obtain the functions and effects described later even when a material having the same magnetic permeability as that of the rack shaft 13 or a material having the same conductivity as that of the rack shaft 13 is used as the material of the target 2. However, to increase the accuracy of position detection, a high magnetic permeability material with a higher magnetic permeability than that of the material of the rack shaft 13 or a high conductivity material with a higher conductivity than the material of the rack shaft 13 is desirably used as the material of the target 2.

A facing surface 2a of the target 2 which faces the substrate 3 is formed in a flat shape parallel to the substrate 3. The facing surface 2a of the target 2 faces the front surface 3a of the substrate 3 in a parallel manner through an air gap G. A back surface 3b of the substrate 3 is fixed to the lid 142 by an adhesive 300. A width W of the air gap G is, e.g., 1 mm. A protruding height H of the target 2 from the outer peripheral surface 13a of the rack shaft 13 in a direction perpendicular to the facing surface 2a is, e.g., 5 mm.

In the present embodiment, two targets 2 are provided at different positions in an axial direction along the central axis C of the rack shaft 13. Although the rack shaft 13 has a circular cross-sectional shape in the present embodiment, the cross-sectional shape of the rack shaft 13 is not limited to a circle and may be, e.g., a D-shape partially having a straight portion, or a polygonal shape.

The substrate 3 is a four-layered substrate in which plate-shaped bases 30 made of a dielectric such as FR4 (glass fiber impregnated with epoxy resin and heat-cured) are arranged between first to fourth metal layers 301 to 304. A thickness of each base 30 is, e.g., 0.3 mm. The first to fourth metal layers 301 to 304 are made of, e.g., copper and each have a thickness of, e.g., 18 µm. The substrate 3 has a flat rectangular shape whose long side direction coincides with the moving direction of the rack shaft 13. The substrate 3 is not limited to a rigid substrate and may be a flexible substrate.

FIG. 4A is an overall view in which wiring patterns formed on first to fourth metal layers 301 to 304 of the substrate 3 are seen through from the back surface 3b side. FIG. 4B is a partial enlarged view of FIG. 4A. FIGS. 5A to 5D are plan views respectively showing the first to fourth metal layers 301 to 304 as viewed from the back surface 3b side. The wiring patterns shown in FIGS. 4A, 4B and 5A to 5D are merely examples, and various forms of wiring patterns can be employed as long as the substrate 3 is formed so that the effects of the invention can be obtained.

In FIGS. 4A, 4B and 5A to 5D, the wiring pattern of the first metal layer 301 is indicated by solid lines, the wiring pattern of the second metal layer 302 is indicated by dashed lines, the wiring pattern of the third metal layer 303 is indicated by dashed-dotted lines, and the wiring pattern of the fourth metal layer 304 is indicated by dashed-double-dotted lines.

A connector portion 35, which has first to tenth through-holes 350 to 359 into which connector pins of a connector 6 indicated by a dashed-double-dotted line in FIG. 4B are respectively inserted, is provided at one longitudinal end portion of the substrate 3. The first to tenth through-holes 350 to 359 are aligned in a straight line along a lateral direction of the substrate 3. A connector 71 (see FIG. 1) of a cable 7 for connection to the power supply unit 4 and the calculation unit 5 is connected to the connector 6. First to sixth vias 360 to 365 for inter-layer connection of the wiring patterns are also formed on the substrate 3.

First and second detection coils 31 and 32 to detect the positions of the targets 2 are formed on the substrate 3. An exciting coil 33 arranged to extend in the axial direction of the rack shaft 13 along the rack shaft 13 is also formed on the substrate 3 so as to surround the first and second detection coils 31 and 32. A sinusoidal alternating current is supplied from the power supply unit 4 to the exciting coil 33. By an action of a magnetic field generated by the exciting coil 33, the first and second detection coils 31 and 32 can detect the positions of the targets 2 in the moving direction of the rack shaft 13 within a predetermined detection range. The first and second detection coils 31 and 32 are arranged side by side in a direction perpendicular to an extending direction of the exciting coil 33 (perpendicular to the axial direction of the rack shaft 13).

First and second curved portions 301a, 301b, a first connector connection portion 301c connecting one end of the first curved portion 301a to the second through-hole 351, a second connector connection portion 301d connecting one end of the second curved portion 301b to the sixth through-hole 355, a first short-circuit line portion 301e connecting the first via 360 to the third via 362, and a second short-circuit line portion 301f connecting the fourth via 363 to the sixth via 365 are formed on the first metal layer 301.

First and second curved portions 302a, 302b, a first connector connection portion 302c connecting one end of the first curved portion 302a to the fourth through-hole 353, and a second connector connection portion 302d connecting one end of the second curved portion 302b to the eighth through-hole 357 are formed on the second metal layer 302.

First and second curved portions 303a, 303b, a first connector connection portion 303c connecting one end of the first curved portion 303a to the third through-hole 352, and a second connector connection portion 303d connecting one end of the second curved portion 303b to the seventh through-hole 356 are formed on the third metal layer 303.

First and second curved portions 304a, 304b, a first connector connection portion 304c connecting one end of the first curved portion 304a to the fifth through-hole 354, and a second connector connection portion 304d connecting one end of the second curved portion 304b to the ninth through-hole 358 are formed on the fourth metal layer 304.

The other end of the first curved portion 301a of the first metal layer 301 and the other end of the first curved portion 303a of the third metal layer 303 are connected to each other by the second via 361. Likewise, the other end of the second curved portion 301b of the first metal layer 301 and the other end of the second curved portion 303b of the third metal layer 303 are connected to each other by the fifth via 364.

The other end of the first curved portion 302a of the second metal layer 302 and the other end of the first curved portion 304a of the fourth metal layer 304 are connected to each other by the first via 360, the third via 362 and the first short-circuit line portion 301e of the first metal layer 301. The other end of the second curved portion 302b of the second metal layer 302 and the other end of the second curved portion 304b of the fourth metal layer 304 are connected to each other by the fourth via 363, the sixth via 365 and the second short-circuit line portion 301f of the first metal layer 301.

The first and second curved portions 301a, 302b of the first metal layer 301, the first and second curved portions 302a, 302b of the second metal layer 302, the first and second curved portions 303a, 303b of the third metal layer 303 and the first and second curved portions 304a, 304b of the fourth metal layer 304 are sinusoidally curved.

The first curved portion 301a of the first metal layer 301 and the first curved portion 303a of the third metal layer 303, and also the first curved portion 302a of the second metal layer 302 and the first curved portion 304a of the fourth metal layer 304, are symmetrical in the lateral direction of the substrate 3 across a first symmetry axis A1 shown in FIG. 4A. Likewise, the second curved portion 301b of the first metal layer 301 and the second curved portion 303b of the third metal layer 303, and also the second curved portion 302b of the second metal layer 302 and the second curved portion 304b of the fourth metal layer 304, are symmetrical in the lateral direction of the substrate 3 across a second symmetry axis A2 shown in FIG. 4A. The first symmetry axis A1 and the second symmetry axis A2 are parallel to each other and are also parallel to the axial direction of the rack shaft 13.

The first detection coil 31 has a first sine wave-shaped coil element 311 composed of the first curved portion 301a of the first metal layer 301 and the first curved portion 303a of the third metal layer 303, and a first cosine wave-shaped coil element 312 composed of the first curved portion 302a of the second metal layer 302, the first curved portion 304a of the fourth metal layer 304, and the first short-circuit line portion 301e of the first metal layer 301. That is, each of the first sine wave-shaped coil element 311 and the first cosine wave-shaped coil element 312 has a shape of two combined sinusoidal-shaped conductor wires (the first curved portion 301a and the first curved portion 303a; the first curved portion 302a and the first curved portion 304a) that are symmetrical across the first symmetry axis A1 when viewed in a direction perpendicular to the axial direction of the rack shaft 13.

The second detection coil 32 has a second sine wave-shaped coil element 321 composed of the second curved portion 301b of the first metal layer 301 and the second curved portion 303b of the third metal layer 303, and a second cosine wave-shaped coil element 322 composed of the second curved portion 302b of the second metal layer 302, the second curved portion 304b of the fourth metal layer 304, and the second short-circuit line portion 301f of the first metal layer 301. That is, each of the second sine wave-shaped coil element 321 and the second cosine wave-shaped coil element 322 has a shape of two combined sinusoidal-shaped conductor wires (the second curved portion 301b and the second curved portion 303b; the second curved portion 302b and the second curved portion 304b) that are symmetrical across the second symmetry axis A2 when viewed in the direction perpendicular to the axial direction of the rack shaft 13.

The exciting coil 33 has a rectangular shape with a pair of long-side portions 331, 332 extending in the axial direction of the rack shaft 13 and a pair of short-side portions 333, 334 between the pair of long-side portions 331, 332. In the present embodiment, the long-side portions 331, 332 and the short-side portions 333, 334 are formed as wiring patterns on the first metal layer 301.

Of the pair of short-side portions 333 and 334, the short-side portion 333 on the connector portion 35 side is composed of two straight portions 333a and 333b sandwiching the first and second connector connection portions 301c and 301d of the first metal layer 301, the first and second connector connection portions 302c and 302d of the second metal layer 302, the first and second connector connection portions 303c and 303d of the third metal layer 303 and the first and second connector connection portions 304c and 304d of the fourth metal layer 304, and respective ends of the two straight portions 333a and 333b are connected to the first through-hole 350 and the tenth through-hole 359 by connector connection portions 301g and 301h formed on the first metal layer 301, as shown in FIG. 4B.

The layer on which the exciting coil 33 is formed is not limited to the first metal layer 301 and may be any of the second to fourth metal layers 302 to 304, or the exciting coil 33 may be formed across plural metal layers. Alternatively, the exciting coil may be formed separately from the substrate 3. Although the exciting coil 33 makes one turn around the first and second detection coils 31 and 32 in the present embodiment, the exciting coil may be formed to make plural turns around the first and second detection coils 31 and 32.

Of the two targets 2 provided on the rack shaft 13, one target 2 is provided so as to correspond to the first detection coil 31, and the other target 2 is provided so as to correspond to the second detection coil 32. Hereinafter, the one target 2 corresponding to the first detection coil 31 is referred to as a first target 21, and the other target 2 corresponding to the second detection coil 32 is referred to as a second target 22.

When a direction perpendicular to the front surface 3a and the back surface 3b of the substrate 3 is defined as the substrate normal direction, the first target 21 is provided at a position lining up with the first detection coil 31 in the substrate normal direction and not lining up with the second detection coil 32 in the substrate normal direction. Likewise, the second target 22 is provided at a position lining up with the second detection coil 32 in the substrate normal direction and not lining up with the first detection coil 31 in the substrate normal direction.

Induced voltage is generated in the first and second detection coils 31 and 32 due to linkage with the magnetic flux of the magnetic field generated by the exciting coil 33. When the target 2 is made of a material with a higher magnetic permeability than that of the rack shaft 13, the magnetic flux intensively flows through the target 2 and the substrate 3 has a higher magnetic flux density at a portion facing the target 2 than at other portions. Meanwhile, when the target 2 is made of a material with a higher conductivity than that of the rack shaft 13, the density of the magnetic flux linking with the first and second detection coils 31 and 32 becomes low due to an eddy current generated in the target 2 by an AC magnetic field, and the substrate 3 has a lower magnetic flux density at the portion facing the target 2 than at other portions. Therefore, the magnitude of voltage induced in the first and second detection coils 31 and 32 changes according to the position of the target 2 relative to the substrate 3. In this regard, when a material with a higher magnetic permeability than that of the rack shaft 13 is used as the material of the target 2, it is desirable to use a magnetic material which has high electric resistance and in which an eddy current is not easily generated.

A voltage having the same cycle as that of an alternating current supplied from the power supply unit 4 to the exciting coil 33 is induced in the first sine wave-shaped coil element 311 and the first cosine wave-shaped coil element 312 of the first detection coil 31, and a peak value of this induced voltage changes according to the position of the first target 21 relative to the substrate 3. Likewise, a voltage having the same cycle as that of the alternating current supplied from the power supply unit 4 to the exciting coil 33 is induced in the second sine wave-shaped coil element 321 and the second cosine wave-shaped coil element 322 of the second detection coil 32, and a peak value of this induced voltage changes according to the position of the second target 21 relative to the substrate 3. The peak value of voltage here means the absolute maximum value of the voltage in one cycle of the alternating current supplied to the exciting coil 33.

Phases of the peak values of the voltages induced in the first sine wave-shaped coil element 311 and the first cosine wave-shaped coil element 312 of the first detection coil 31 during when the rack shaft 13 moves from one moving end to another moving end in the axial direction are different from each other. Likewise, phases of the peak values of the voltages induced in the second sine wave-shaped coil element 321 and the second cosine wave-shaped coil element 322 of the second detection coil 32 during when the rack shaft 13 moves from the one moving end to the other moving end in the axial direction are also different from each other.

In the present embodiment, the phase difference between the peak values of the voltages induced in the first sine wave-shaped coil element 311 and the first cosine wave-shaped coil element 312 of the first detection coil 31 and the phase difference between the peak values of the voltages induced in the second sine wave-shaped coil element 321 and the second cosine wave-shaped coil element 322 of the second detection coil 32 are each 90°. The voltages induced in the first sine wave-shaped coil element 311 and the first cosine wave-shaped coil element 312 of the first detection coil 31 and the voltages induced in second sine wave-shaped coil element 321 and the second cosine wave-shaped coil element 322 of the second detection coil 32 are each output as output voltage to the calculation unit 5 through the cable 7.

As shown in FIG. 4A, first and second buffer regions E1 and E2 to suppress voltages induced in the first sine wave-shaped coil element 311, the first cosine wave-shaped coil element 312, the second sine wave-shaped coil element 321 and the second cosine wave-shaped coil element 322 by a magnetic flux generated by a current flowing through the pair of short-side portions 333, 334 are provided between the pair of short-side portions 333, 334 of the exciting coil 33 and the first detection coil 31/the second detection coil 32.

In the first buffer region E1, to suppress induced voltage generated when the first target 21 or the second target 22 is present at a position aligned with the first buffer region E1 in the substrate normal direction, the first connector connection portions 301c, 302c, 303c, 304c respectively formed on the first to fourth metal layers 301 to 304 overlap in a thickness direction of the substrate 3 and the second connector connection portions 301d, 302d, 303d, 304d respectively formed on the first to fourth metal layers 301 to 304 overlap in the thickness direction of the substrate 3.

FIG. 6 is a graph showing an example of a relationship between supply voltage V0 supplied from the power supply unit 4 to the exciting coil 33, induced voltage VS1 induced in the first sine wave-shaped coil element 311 of the first detection coil 31 and induced voltage VC1 induced in the first cosine wave-shaped coil element 312. In the graph of FIG. 6, the horizontal axis is the time axis, and the left and right vertical axes indicate the supply voltage V0 and the induced voltages VS1, VC1. A high-frequency AC voltage of, e.g., about 1 MHz is supplied as the supply voltage V0 to the exciting coil 33.

The supply voltage V0 and the induced voltages VS1, VC1 are in phase with each other in the example shown in FIG. 6. However, the induced voltage VS1 induced in the first sine wave-shaped coil element 311 switches between in-phase and antiphase at the time that the first target 21 passes through a position corresponding to an intersection point between the first curved portion 301a of the first metal layer 301 and the first curved portion 303a of the third metal layer 303 as viewed in the substrate normal direction. Likewise, the induced voltage VC1 induced in the first cosine wave-shaped coil element 312 switches between in-phase and antiphase at the time that the first target 21 passes through a position corresponding to an intersection point between the first curved portion 302a of the second metal layer 302 and the first curved portion 304a of the fourth metal layer 304 as viewed in the substrate normal direction.

FIG. 7A is an explanatory diagram schematically illustrating a relationship between the position of the first target 21 and peak voltage VSP1 which is the peak value of the induced voltage VS1 induced in the first sine wave-shaped coil element 311. FIG. 7B is an explanatory diagram schematically illustrating a relationship between the position of the first target 21 and peak voltage VCP1 which is the peak value of the induced voltage VC1 induced in the first cosine wave-shaped coil element 312.

In the graphs of the peak voltages VSP1 and VCP1 shown in FIGS. 7A and 7B, the horizontal axis indicates the position of the center of the first target 21. P1 on the horizontal axis indicates the position of the central portion of the first target 21 when the left end of the first target 21 coincides with the left ends of the first sine wave-shaped coil element 311 and the first cosine wave-shaped coil element 312. P2 on the horizontal axis indicates the position of the central portion of the first target 21 when the right end of the first target 21 coincides with the right ends of the first sine wave-shaped coil element 311 and the first cosine wave-shaped coil element 312. In FIGS. 7A and 7B, the first target 21 located at the position P1 is indicated by a dashed-dotted line, and the first target 21 located at the position P2 is indicated by a dashed-double-dotted line.

In addition, in FIGS. 7A and 7B, the magnetic field generated by an eddy current in the first target 21 is schematically indicated by arrows. Due to a difference in magnetic field strength between a portion facing the first target 21 in the substrate normal direction and a portion not facing the first target 21, the output voltages of the first sine wave-shaped coil element 311 and the first cosine wave-shaped coil element 312 change according to the position of the rack shaft 13.

In the graph shown in FIG. 7A, the peak voltage VSP1 has a positive value when the induced voltage VS1 induced in the first sine wave-shaped coil element 311 is in phase with the supply voltage V0 supplied to the exciting coil 33, and has a negative value when in antiphase. Likewise, in the graph shown in FIG. 7B, the peak voltage VCP1 has a positive value when the induced voltage VC1 induced in the first cosine wave-shaped coil element 312 is in phase with the supply voltage V0 supplied to the exciting coil 33, and has a negative value when in antiphase.

When the rack shaft 13 moves in one direction, the peak voltage VSP1 changes sinusoidally and the peak voltage VCP1 changes cosinusoidally as shown in FIGS. 7A and 7B during when the entire portion of the first target 21 in the axial direction of the rack shaft 13 is overlapping the first sine wave-shaped coil element 311 and the first cosine wave-shaped coil element 312 in the substrate normal direction. Thus, the calculation unit 5 can determine the position of the rack shaft 13 by calculation based on the output voltages of the first sine wave-shaped coil element 311 and the first cosine wave-shaped coil element 312.

Likewise for the second detection coil 32, when the rack shaft 13 moves in one direction, a peak voltage VSP2, which is a peak value of an induced voltage VS2 induced in the second sine wave-shaped coil element 321, changes sinusoidally and a peak voltage VCP2, which is a peak value of an induced voltage VC2 induced in the second cosine wave-shaped coil element 322, changes cosinusoidally during when the entire portion of the second target 22 in the axial direction of the rack shaft 13 is overlapping the second sine wave-shaped coil element 321 and the second cosine wave-shaped coil element 322 in the substrate normal direction. Thus, the calculation unit 5 can determine the position of the rack shaft 13 by calculation based on the output voltages of the second sine wave-shaped coil element 321 and the second cosine wave-shaped coil element 322. The details of how the calculation unit 5 calculates the position of the rack shaft 13 will be described later.

Figure 8A:
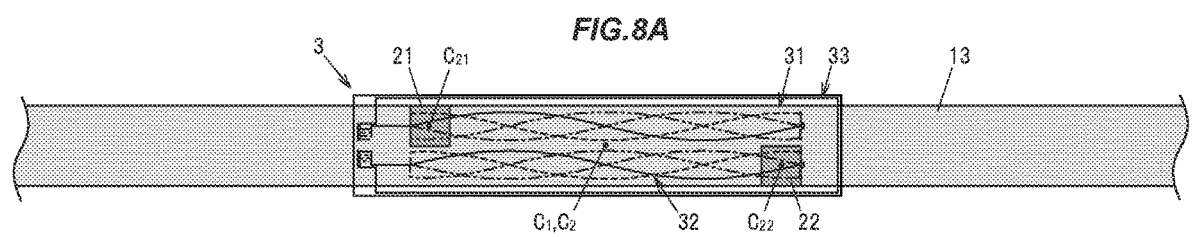
FIGS. 8A to 8C are explanatory diagrams illustrating a positional relationship of the first and second detection coils relative to the first and second targets.
Figure 8B:
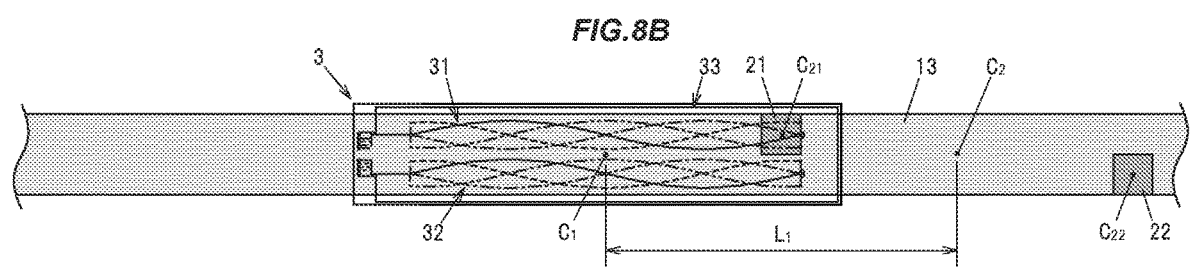
Figure 8C:
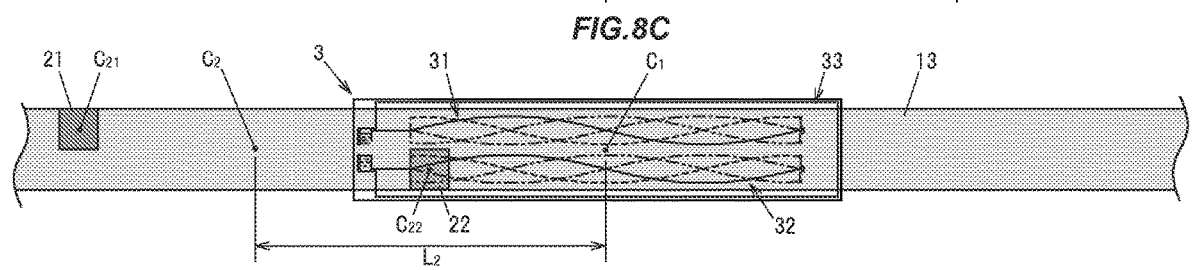

FIGS. 8A to 8C are explanatory diagrams illustrating a positional relationship of the first and second detection coils 31, 32 relative to the first and second targets 21, 22 in the substrate normal direction. In FIGS. 8A to 8C, the first and second detection coils 31, 32 and the exciting coil 33 are seen through the base 30 from the back surface 3b side of substrate 3 and are superimposed on the rack shaft 13 and the first and second targets 21, 22 in the substrate normal direction.

FIGS. 8A to 8C also show a center point C1 of a range on the substrate 3 where the first and second detection coils 31 and 32 are formed, center points C21, C22 of the respective facing surfaces 2a of the first and second targets 21, 22, and a midpoint C2 between the center points C21 and C22.

FIG. 8A shows a state in which the rack shaft 13 is in the neutral position at which the steering angle of the steering wheel 17 is zero, and the center point C1 coincides with the midpoint C2. In this state, the left end of the first target 21 coincides with the left end of the first detection coil 31, and the right end of the second target 22 coincides with the right end of the second detection coil 32.

FIG. 8B shows a state in which the right end of the first target 21 coincides with the right end of the first detection coil 31. The distance in the axial direction of the rack shaft 13 between the center point C1 and the midpoint C2 in this state is defined as L1. The range of the distance L1 is a detection range where the position of the first target 21 can be detected by the first detection coil 31.

FIG. 8C shows a state in which the left end of the second target 22 coincides with the left end of the second detection coil 32. The distance in the axial direction of the rack shaft 13 between the center point C1 and the midpoint C2 in this state is defined as L2. The range of the distance L2 is a detection range where the position of the second target 22 can be detected by the second detection coil 32.

In this manner, the detection range where the position of the first target 21 can be detected by the first detection coil 31 and the detection range where the position of the second target 22 can be detected by the second detection coil 32 are offset in the moving direction of the rack shaft 13. In addition, when the rack shaft 13 is in the neutral position, the position of the first target 21 can be detected by the first detection coil 31 and the position of the second target 22 can be detected by the second detection coil 32. That is, the detection range where the position of the first target 21 can be detected by the first detection coil 31 and the detection range where the position of the second target 22 can be detected by the second detection coil 32 partially overlap and are continuous in the moving direction of the rack shaft 13.

The calculation unit 5 can calculate and determine the absolute position of the rack shaft 13 in an axial range of length L1+L2, with the neutral position of the rack shaft 13 at the center. The length L1+L2 is the same as or longer than the length of the stroke range R of the rack shaft 13 (see FIG. 1), and the stroke sensor 1 can detect the absolute position of the rack shaft 13 over the entire stroke range R.

Figure 9:
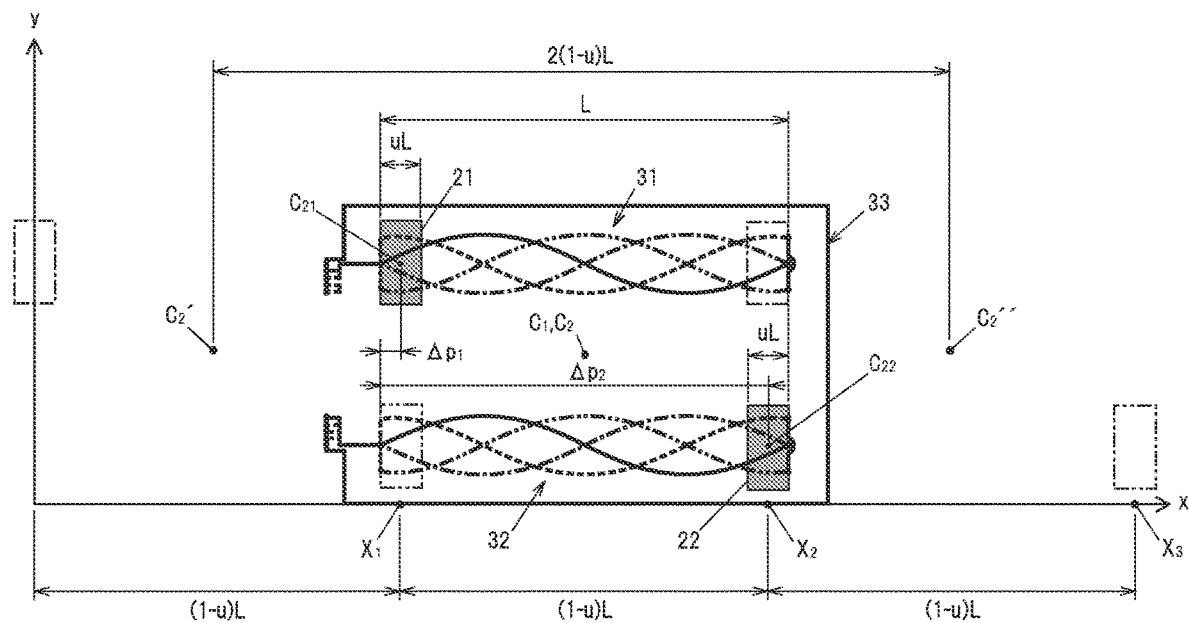
FIG. 9 is a schematic diagram illustrating a dimensional relationship between the first and second detection coils and an exciting coil on the substrate and the first and second targets.

FIG. 9 is a schematic diagram illustrating a dimensional relationship between the first and second detection coils 31, 32 and the exciting coil 33 on the substrate 3 and the first and second targets 21, 22. In FIG. 9, the axial direction of the rack shaft 13 is the x-axis direction, and a direction parallel to the substrate 3 and perpendicular to the x-axis direction is the y-axis direction. In addition, in FIG. 9, the dimensions of the first and second detection coils 31 and 32 and the exciting coil 33 in the y-axis direction are enlarged two times, and a spacing between the first detection coil 31 and the second detection coil 32 is enlarged in the y-axis direction.

The origin of the x-axis is a position at which the center point C21 of the facing surface 2a of the first target 21 is located when in the state shown in FIG. 8C, and the origin of the y-axis is a position at which the long-side portion 332 of the exciting coil 33 is located. A coordinate point X1 on the x-axis indicates a position in the x-axis direction at which the center point C21 of the facing surface 2a of the first target 21 is located when in the state shown in FIG. 8A, and a coordinate point X2 on the x-axis indicates a position in the x-axis direction at which the center point C22 of the facing surface 2a of the second target 22 is located when in the state shown in FIG. 8A. A coordinate point X3 on the x-axis indicates a position in the x-axis direction at which the center point C22 of the facing surface 2a of the second target 22 is located when in the state shown in FIG. 8B. A coordinate point C2' is a position at which the midpoint C2 between the center points C21 and C22 of the first and second targets 21 and 22 is located when in the state shown in FIG. 8C, and a coordinate point C2" is a position at which the midpoint C2 between the center points C21 and C22 of the first and second targets 21 and 22 is located when in the state shown in FIG. 8B.

In FIG. 9, L is the length of the first and second detection coils 31 and 32 in the x-axis direction. u is a ratio of the length of the first and second targets 21 and 22 in the x-axis direction to L. $\Delta p1$ is a distance in the x-axis direction from the left ends of the first and second detection coils 31 and 32 to the center point C21 of the first target 21. $\Delta p2$ is a distance in the x-axis direction from the left ends of the first and second detection coils 31 and 32 to the center point C22 of the second target 22.

When the first target 21 overlaps the first sine wave-shaped coil element 311 and the first cosine wave-shaped coil element 312 in the substrate normal direction, $\Delta p1$ can be obtained by the following equation (1).

$$\Delta p_1 = L \frac{\tan^{-1}\left(\frac{V_{SP1}}{V_{CP1}}\right)}{2\pi} \quad (1)$$

When the second target 22 overlaps the second sine wave-shaped coil element 321 and the second cosine wave-shaped coil element 322 in the substrate normal direction, $\Delta p2$ can be obtained by the following equation (2).

$$\Delta p_2 = L \frac{\tan^{-1}\left(\frac{V_{SP2}}{V_{CP2}}\right)}{2\pi} \quad (2)$$

The calculation unit 5 can determine the absolute position of the rack shaft 13 by calculation using the equation (1) or the equation (2). The movement distance of the rack shaft 13 in the x-axis direction over which the calculation unit 5 can determine the absolute position of the rack shaft 13 by the equation (1) and the movement distance of the rack shaft 13 in the x-axis direction over which the calculation unit 5 can determine the absolute position of the rack shaft 13 by the formula (2) are each (1−u)L. Thus, in the present embodiment, the overall movement distance of the rack shaft 13 over which the calculation unit 5 can determine the absolute position of the rack shaft 13 is 2(1−u)L. In this regard, u is a value smaller than 0.5. The smaller the value of u, the longer the distance over which the absolute position of the rack shaft 13 can be detected, but if the value of u is too small, the induced voltages become small and errors are likely to be larger. Therefore, the value of u is desirably, e.g., not less than 0.01 and less than 0.5.

Functions and Effects of the Embodiment

In the embodiment described above, it is possible to detect the absolute position of the rack shaft 13 over a longer distance than the length L of the first and second detection coils 31 and 32 in the x-axis direction. In other words, the length L of the first and second detection coils 31 and 32 in the x-axis direction, which is the axial direction of the rack shaft 13, can be shorter than the maximum travel distance of the rack shaft 13, which allows for size reduction of the stroke sensor 1. In addition, in the present embodiment, it is possible to reduce the size of the substrate 3 on which the first and second detection coils 31 and 32 are formed.

Modified Example

Figure 10A:
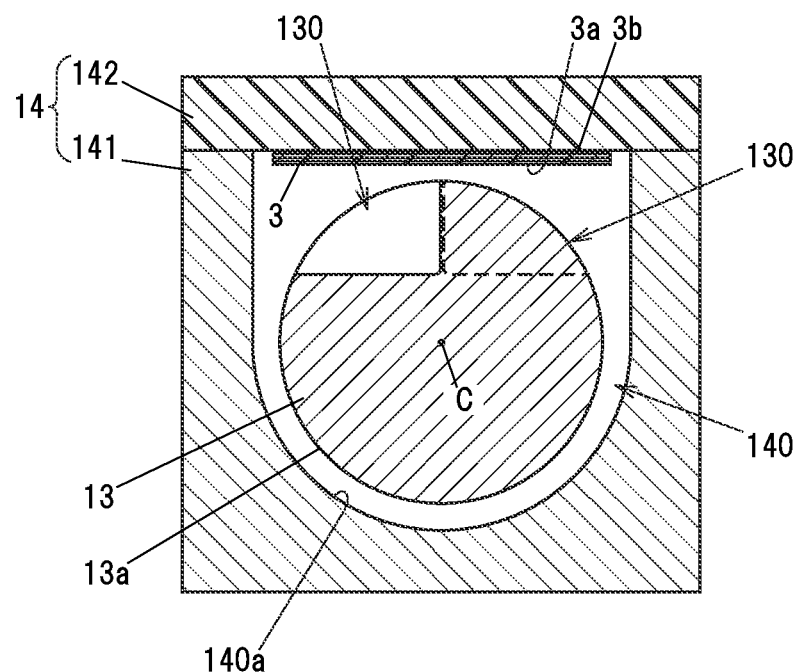
FIG. 10A is a cross-sectional view showing the rack shaft in a modified example, together with the substrate and the housing.
Figure 10B:
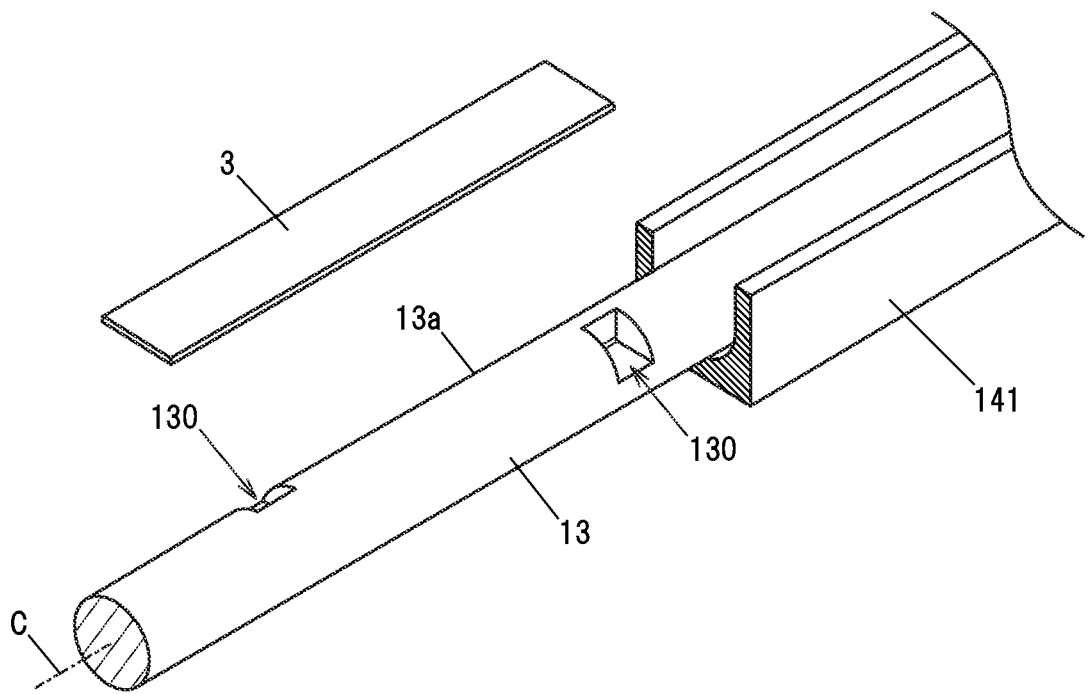
FIG. 10B is a perspective view showing the rack shaft in the modified example.

Next, a modified example of the embodiment will be described in reference to FIG. 10. FIG. 10A is a cross-sectional view showing the rack shaft 13 in the modified example, together with the substrate 3 and the housing 14. FIG. 10B is a perspective view showing the rack shaft 13, the substrate 3 and the main body 141 of the housing 14 in the modified example. The substrate 3 is configured in the same manner as in the embodiment described above and is connected to the power supply unit 4 and the calculation unit 5 through the connector 6 and the cable 7.

In the embodiment described above, the example in which the detection object portion for detection of the position of the rack shaft 13 is the target 2 protruding toward the substrate 3 beyond the outer peripheral surface 13a of the rack shaft 13 has been described. In contrast, in this modified example, the detection object portion is a recessed portion 130 provided on the rack shaft 13. The rack shaft 13 has a conductivity, and the recessed portion 130 is recessed from the outer peripheral surface 13a of the rack shaft 13.

Two recessed portions 130 are provided on the rack shaft 13 at different positions in the axial direction of the rack shaft 13 so as to respectively correspond to the first and second detection coils 31 and 32, and the respective detection ranges of the first and second detection coils 31 and 32 are offset in the moving direction of the rack shaft 13. The positions where the two recessed portions 130 are provided are the same as the positions where the first and second targets 21 and 22 are provided in the embodiment described above.

Of the two recessed portions 130, one recessed portion 130 is provided at a position lining up with the first detection coil 31 in the substrate normal direction and not lining up with the second detection coil 32 in the substrate normal direction. The other recessed portion 130 is provided at a position lining up with the second detection coil 32 in the substrate normal direction and not lining up with the first detection coil 31 in the substrate normal direction. In the substrate 3, the magnetic field strength at a portion facing the recessed portion 130 is weaker than the magnetic field strength at a portion not facing the recessed portion 130. The output voltages of the first and second detection coils 31 and 32 change according to the position of the rack shaft 13 due to a difference in magnetic field strength between the portion facing the recessed portion 130 and the portion not facing the recessed portion 130.

Also in this modified example, it is possible to detect the absolute position of the rack shaft 13 over a longer distance than the length of the first and second detection coils 31 and 32, in the same manner as the embodiment described above. In addition, the distance between the rack shaft 13 and the substrate 3 can be reduced as compared to the embodiment described above, allowing for further size reduction. In this regard, to suppress a decrease in rigidity of the rack shaft 13 caused by providing the recessed portions 130, the recessed portions 130 may be filled with, e.g., a non-conductive filler made of hard resin, etc.

Second Embodiment

Figure 11:
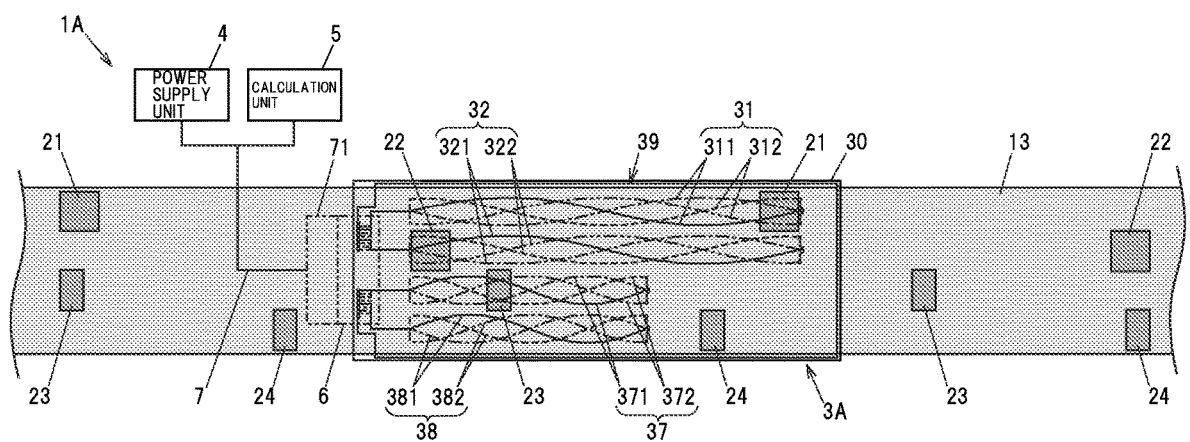
FIG. 11 is an explanatory diagram illustrating a circuit configuration in the second embodiment together with the rack shaft, where the wiring pattern formed on each layer of the substrate is shown in a see-through manner.

Next, the second embodiment of the invention will be described in reference to FIG. 11. FIG. 11 is a configuration diagram illustrating a stroke sensor 1A in the second embodiment. FIG. 11 shows the circuit configuration of the stroke sensor 1A superimposed on the rack shaft 13, where the wiring pattern formed on each layer of a substrate 3A is shown in a see-through manner.

The first and second detection coils 31, 32, third and fourth detection coils 37, 38 and an exciting coil 39 are formed on the substrate 3A. The substrate 3A is a four-layered substrate in the same manner as the first embodiment, and the first and second detection coils 31, 32, the third and fourth detection coils 37, 38, and the exciting coil 39 are distributed between layers.

The shape and size of the first and second detection coils 31 and 32 are the same as in the first embodiment. The third and fourth detection coils 37 and 38 have third and fourth sine wave-shaped coil elements 371, 381 and third and fourth cosine wave-shaped coil elements 372, 382 which are different in size from the first and second sine wave-shaped coil elements 311, 321 and the first and second cosine wave-shaped coil elements 312, 322 and have a shorter length in the axial direction of the rack shaft 13.

The exciting coil 39 is formed so as to surround the first and second detection coils 31, 32 and the third and fourth detection coils 37, 38 and is connected to the power supply unit 4 through the connector 6 and the cable 7. The first and second detection coils 31, 32 and the third and fourth detection coils 37, 38 are connected to the calculation unit 5 through the connector 6 and the cable 7.

As the plurality of detection object portions for detection of the position of the rack shaft 13, plural first targets 21 corresponding to the first detection coil 31, plural second targets 22 corresponding to the second detection coil 32, plural third targets 23 corresponding to the third detection coil 37, and plural fourth targets 24 corresponding to the fourth detection coil 38 are provided on the rack shaft 13 and are respectively aligned in the axial direction of the rack shaft 13.

The plural first targets 21 are spaced apart in the axial direction of the rack shaft 13 at a predetermined interval. The plural second targets 22 are spaced apart in the axial direction of the rack shaft 13 at the same predetermined interval as the plural first targets 21. The plural third targets 23 are spaced apart in the axial direction of the rack shaft 13 at predetermined intervals narrower than the interval of the plural first targets 21. The plural fourth targets 24 are spaced apart in the axial direction of the rack shaft 13 at the same predetermined intervals as the plural third targets 23.

During when the rack shaft 13 moves from the one moving end to the other moving end in the axial direction, the first detection coil 31 faces the plural first targets 21 in the substrate normal direction and the second detection coil 32 faces the plural second targets 22 in the substrate normal direction. In addition, during when the rack shaft 13 moves from the one moving end to the other moving end in the axial direction, the third detection coil 37 faces the plural third targets 23 in the substrate normal direction and the fourth detection coil 38 faces the plural fourth targets 24 in the substrate normal direction.

The detection range where the positions of the plural first targets 21 in the axial direction of the rack shaft 13 can be detected by the first detection coil 31 and the detection range where the positions of the plural second targets 22 in the axial direction of the rack shaft 13 can be detected by the second detection coil 32 are partially overlap and are continuous in the moving direction of the rack shaft 13. Likewise, the detection range where the positions of the plural third targets 23 in the axial direction of the rack shaft 13 can be detected by the third detection coil 37 and the detection range where the positions of the plural fourth targets 24 in the axial direction of the rack shaft 13 can be detected by the fourth detection coil 38 are partially overlap and are continuous in the moving direction of the rack shaft 13.

When the rack shaft 13 moves in one direction, the distance that the rack shaft 13 moves during one cycle of change in the peak values of the voltages induced in the first and second detection coils 31 and 32 is different from the distance that the rack shaft 13 moves during one cycle of change in the peak values of the voltages induced in the third and fourth detection coils 37 and 38. In the second embodiment, in proportion to the difference in length in the axial direction of the rack shaft 13 between the first and second detection coils 31, 32 and the third and fourth detection coils 37, 38, the distance that the rack shaft 13 moves during one cycle of change in the peak values of the voltages induced in the third and fourth detection coils 37 and 38 is shorter than the distance that the rack shaft 13 moves during one cycle of change in the peak values of the voltages induced in the first and second detection coils 31 and 32.

When the distance that the rack shaft 13 moves during one cycle of change in the peak values of the voltages induced in the first and second detection coils 31 and 32 is defined as X12 and the distance that the rack shaft 13 moves during one cycle of change in the peak values of the voltages induced in the third and fourth detection coils 37 and 38 is defined as X34, X34 is shorter than X12 and X12 is a non-integer multiple of X34. Thus, the calculation unit 5 can calculate the absolute position of the rack shaft 13 over a longer distance than the length L1+L2 in the first embodiment by comparing the position of the first target 21 or the second target 22 determined based on an output signal of the first detection coil 31 or the second detection coil 32 with the position of the third target 23 or the fourth target 24 determined based on an output signal of the third detection coil 37 or the four detection coil 38. In addition, if the length of the stroke range of the rack shaft 13 is the same as that in the first embodiment, the length of the substrate 3A in the axial direction of the rack shaft 13 can be even shorter than the length of the substrate 3 in the axial direction in the first embodiment.

Third Embodiment

Figure 12:
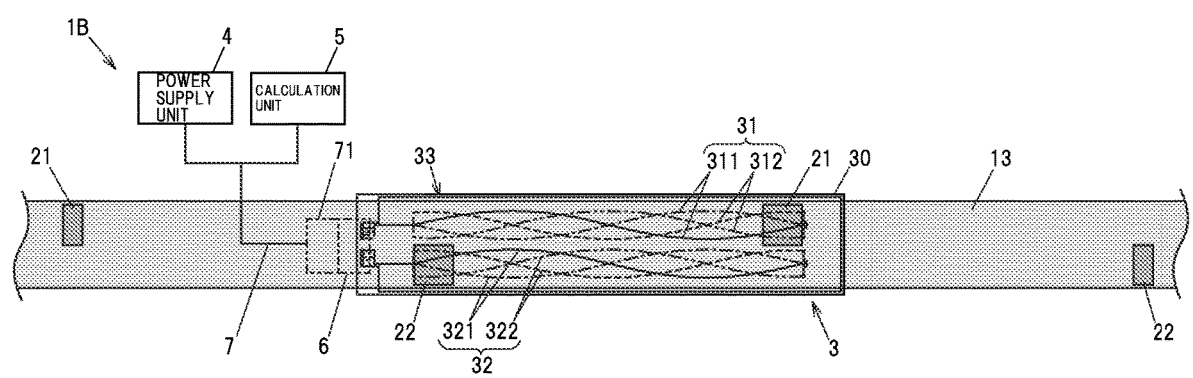
FIG. 12 is an explanatory diagram illustrating a circuit configuration in the third embodiment together with the rack shaft, where the wiring pattern formed on each layer of the substrate is shown in a see-through manner.

Next, the third embodiment of the invention will be described in reference to FIG. 12. FIG. 12 is a configuration diagram illustrating a stroke sensor 1B in the third embodiment. FIG. 12 shows the circuit configuration of the stroke sensor 1B superimposed on the rack shaft 13, where the wiring pattern formed on each layer of the substrate 3 is shown in a see-through manner.

The substrate 3 is configured in the same manner as in the first embodiment. Plural first targets 21, which are provided as the detection object portions corresponding to the first detection coil 31 and are spaced apart in the axial direction of the rack shaft 13, and plural second targets 22, which are provided as the detection object portions corresponding to the second detection coil 32 and are spaced apart in the axial direction of the rack shaft 13, are provided on the rack shaft 13.

The detection range where the positions of the plural first targets 21 can be detected by the first detection coil 31 and the detection range where the positions of the second targets 22 can be detected by the second detection coil 32 are partially overlap and are continuous in the moving direction of the rack shaft 13. During when the rack shaft 13 moves from the one moving end to the other moving end, the plural first targets 21 face the first detection coil 31 and the plural second targets 22 face the second detection coil 32.

Each of the plural first targets 21 has a different length in the axial direction of the rack shaft 13. Likewise, each of the plural second targets 22 has a different length in the axial direction of the rack shaft 13.

A magnitude of the induced voltage induced in the first detection coil 31 differs according to the length of the first target 21, and a magnitude of the induced voltage induced in the second detection coil 32 differs according to the length of the second target 22. Thus, based on the magnitude of the induced voltage, the calculation unit 5 can determine which of the plural first targets 21 is facing the first detection coil 31 and which of the plural second targets 22 is facing the second detection coil 32. It is thereby possible to calculate the absolute position of the rack shaft 13 over a longer distance than the length L1+L2 in the first embodiment.

SUMMARY OF THE EMBODIMENTS

Technical ideas understood from the embodiments will be described below citing the reference signs, etc., used for the embodiments. However, each reference sign, etc., described below is not intended to limit the constituent elements in the claims to the members, etc., specifically described in the embodiments.

According to the first feature, a position detection device (the stroke sensor 1) configured to detect a position of a moving member (the rack shaft 13) that moves back and forth in a predetermined moving direction, the position detection device 1, 1A, 1B comprising: an exciting coil 33, 39 arranged to extend in the moving direction along the moving member 13; and a detection coil 31, 32, 37, 38 that, by an action of a magnetic field generated by the exciting coil 33, 39, can detect a position, in the moving direction, of a detection object portion (the target 2, the first to fourth targets 21-24, the recessed portion 130) provided on the moving member 13 within a predetermined detection range, wherein a plurality of the detection coils 31, 32, 37, 38 are arranged side by side in a direction perpendicular to an extending direction of the exciting coil 33, 39, wherein a plurality of the detection object portions 2, 21-24, 130 are provided at different positions in the moving direction so as to respectively correspond to the plurality of the detection coils 31, 32, 37, 38, and wherein the respective detection ranges of the plurality of the detection coils 31, 32, 37, 38 are offset in the moving direction of the moving member 13.

According to the second feature, in the position detection device 1 as described by the first feature, the detection coil 31, 32, 37, 38 comprises a pair of coil elements 311, 312, 321, 322, 371, 372, 381, 382 with output voltages that change according to the position of the moving member 13, and phases of the respective output voltages of the pair of coil elements 311, 312, 321, 322, 371, 372, 381, 382 during movement of the moving member 13 is different from each other.

According to the third feature, in the position detection device 1, 1A, 1B as described by the second feature, each of the pair of coil elements 311, 312, 321, 322, 371, 372, 381, 382 has a shape of two combined sinusoidal-shaped conductor wires 301a, 301b, 302a, 302b, 303a, 303b, 304a, 304b that are symmetrical across a symmetry axis A1, A2 parallel to the moving direction when viewed in a direction perpendicular to the moving direction, and the output voltage changes according to the position of the moving member 13 due to a difference in magnetic field strength between a portion facing the detection object portion 2, 21-24, 130 and a portion not facing the detection object portion 2, 21-24, 130.

According to the fourth feature, in the position detection device 1, 1A, 1B as described by the first feature, the exciting coil 33, 39 and the plurality of the detection coils 31, 32, 37, 38 are formed on one substrate 3, 3A, and the exciting coil 33, 39 is formed on the substrate 3, 3A so as to surround the plurality of the detection coils 31, 32, 37, 38.

According to the fifth feature, in the position detection device 1, 1A, 1B as described by the first feature, the detection object portion 2, 21-24 comprises a conductive member protruding toward the detection coil 31, 32, 37, 38.

According to the sixth feature, in the position detection device 1 as described by the first feature, the moving member 13 has conductivity, and wherein the detection object portion comprises a recessed portion 130 provided on the moving member 13.

According to the seventh feature, in the position detection device 1, 1A, 1B as described by any one of the first to sixth features, the plurality of the detection coils comprise a first detection coil 31 and a second detection coil 32, and the detection range of the first detection coil 31 and the detection range of the second detection coil 32 partially overlap and are continuous in the moving direction.

According to the eighth feature, in the position detection device 1, 1A, 1B as described by the seventh feature, during when the moving member 13 moves from one moving end to another moving end in the moving direction, each of the first detection coil 31 and the second detection coil 32 faces a plurality of the detection object portions 2, 21, 22 that are provided so as to be spaced apart in the moving direction.

According to the ninth feature, in the position detection device 1B as described by the eighth feature, the plurality of the detection object portions 21, which face the first detection coil 31 during when the moving member 13 moves from the one moving end to the other moving end, each have a different length in the moving direction, and the plurality of the detection object portions 22, which face the second detection coil 32 during when the moving member 13 moves from the one moving end to the other moving end, each have a different length in the moving direction.

According to the tenth feature, in the position detection device 1A as described by any one of the first to sixth features, among the plurality of the detection coils 31, 32, 37, 38, at least one detection coil 31, 32 and at least one other detection coil 37, 38 have different lengths from each other in the moving direction, and wherein a cycle of an output signal of the at least one detection coil 31, 32 and a cycle of an output signal of the at least one other detection coil 37, 38 during movement of the moving member 13 are different from each other.

According to the eleventh feature, in the position detection device 1A as described by the tenth feature, during when the moving member 13 moves from the one moving end to the other moving end in the moving direction, each of the plurality of detection coils 31, 32, 37, 38 faces a plurality of the detection object portions 21-24 that are provided so as to be spaced apart in the moving direction.

Although the embodiments and modification of the invention have been described, the invention according to claims is not to be limited to the embodiments and modification described above. Further, please note that not all combinations of the features described in each of the embodiments and modification are necessary to solve the problem of the invention.

In addition, the invention can be appropriately modified and implemented without departing from the gist thereof. For example, in the above-described second embodiment, although the example in which the first to fourth targets 21 to 24 are provided as the detection object portions on the rack shaft 13 has been described, recessed portions provided on the rack shaft 13 as in the above-described modified example may be used as the detection object portions in place of the first to fourth targets 21 to 24. Likewise, in the third embodiment, in place of the plural first and second targets 21 and 22 having different lengths in the axial direction of the rack shaft 13, plural recessed portions having different lengths in the axial direction of the rack shaft 13 may be provided as the detection object portions on the rack shaft 13.

In addition, the moving member subjected to position detection by the stroke sensor 1, 1A, 1B is not limited to the rack shaft 13 of the steering system 10 and may be a shaft to be mounted on an automobile or a shaft not to be mounted on an automobile. In addition, the shape of the moving member is not limited to a shaft shape and can be various shapes such as a flat plate shape.

The invention claimed is:

1. A position detection device configured to detect a position of a moving member that moves back and forth in a predetermined moving direction, the position detection device comprising:
   an exciting coil arranged to extend in the moving direction along the moving member; and
   a detection coil that, by an action of a magnetic field generated by the exciting coil, can detect a position, in the moving direction, of a detection object portion provided on the moving member within a predetermined detection range,
   wherein a plurality of the detection coils are arranged side by side in a direction perpendicular to an extending direction of the exciting coil,
   wherein a plurality of the detection object portions are provided at different positions in the moving direction so as to respectively correspond to the plurality of the detection coils, and
   wherein the respective detection ranges of the plurality of the detection coils are offset in the moving direction of the moving member.

2. The position detection device according to claim 1, wherein the detection coil comprises a pair of coil elements with output voltages that change according to the position of the moving member, and phases of the respective output voltages of the pair of coil elements during movement of the moving member is different from each other.

3. The position detection device according to claim 2, wherein each of the pair of coil elements has a shape of two combined sinusoidal-shaped conductor wires that are symmetrical across a symmetry axis parallel to the moving direction when viewed in a direction perpendicular to the moving direction, and the output voltage changes according to the position of the moving member due to a difference in magnetic field strength between a portion facing the detection object portion and a portion not facing the detection object portion.

4. The position detection device according to claim 1, wherein the exciting coil and the plurality of the detection coils are formed on one substrate, and wherein the exciting coil is formed on the substrate so as to surround the plurality of the detection coils.

5. The position detection device according to claim 1, wherein the detection object portion comprises a conductive member protruding toward the detection coil.

6. The position detection device according to claim 1, wherein the moving member has conductivity, and wherein the detection object portion comprises a recessed portion provided on the moving member.

7. The position detection device according to claim 1, wherein the plurality of the detection coils comprise a first detection coil and a second detection coil, and wherein the detection range of the first detection coil and the detection range of the second detection coil partially overlap and are continuous in the moving direction.

8. The position detection device according to claim 7, wherein during when the moving member moves from one moving end to an other moving end in the moving direction, each of the first detection coil and the second detection coil faces a plurality of the detection object portions that are provided so as to be spaced apart in the moving direction.

9. The position detection device according to claim 8, wherein the plurality of the detection object portions, which face the first detection coil during when the moving member moves from the one moving end to the other moving end, each have a different length in the moving direction, and wherein the plurality of the detection object portions, which face the second detection coil during when the moving member moves from the one moving end to the other moving end, each have a different length in the moving direction.

10. The position detection device according to claim 1, wherein among the plurality of the detection coils, at least one detection coil and at least one other detection coil have different lengths from each other in the moving direction, and wherein a cycle of an output signal of the at least one detection coil and a cycle of an output signal of the at least one other detection coil during movement of the moving member are different from each other.

11. The position detection device according to claim 10, wherein during when the moving member moves from one moving end to an other moving end in the moving direction, each of the plurality of detection coils faces a plurality of the detection object portions that are provided so as to be spaced apart in the moving direction.

* * * * *